ADDUCTS OF ALKENYL ISOCYANATES WITH BISPHENOL A AND DERIVATIVES THEREOF

Robert M. Nowak, James T. K. Woo, and Dietrich H. Heinert, Midland, Mich., assignors to The Dow Chemical Company, Midland, Mich.
No Drawing. Filed June 16, 1969, Ser. No. 833,714
Int. Cl. C07c *125/06*
U.S. Cl. 260—479                   9 Claims

ABSTRACT OF THE DISCLOSURE

Vinyl isocyanate and isopropenyl isocyanate react with Bisphenol A, halogenated Bisphenol A, and the alkylene oxide addition products thereof to form the corresponding bis(N-alkenylcarbamate) esters. These divinyl compounds are useful monomers and crosslinking agents.

BACKGROUND OF THE INVENTION

This invention concerns new chemical compounds produced by the reaction of vinyl isocyanate or isopropenyl isocyanate with p,p'-isopropylidenediphenol (Bisphenol A) and various derivatives thereof. The difunctional N-alkenyl compounds thereby produced are useful monomers and crosslinking reagents.

Vinyl isocyanate has been reacted in the past with dihydroxy compounds such as alkanediols and dihydric phenols. These prior art compounds have been polymerized by cationic catalysts or by free radical initiators such as X-rays. The N-vinylcarbamate groups in these compounds are linked by relatively small divalent radicals.

SUMMARY OF THE INVENTION

A family of new bis(N-alkenylcarbamate) esters has now been found wherein a relatively large divalent linking radical comprising two cyclic groups imparts different and valuable properties to these monomers. These compounds are the adducts of vinyl isocyanate and isopropenyl isocyanate with Bisphenol A, halogenated Bisphenol A, hydrogenated Bisphenol A and the lower alkylene oxide addition products of these bisphenol compounds. They are defined by one of the formulas:

(A) 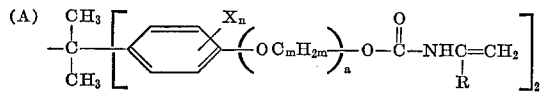

or (B) 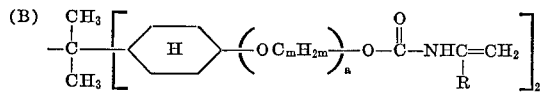

where X is chlorine or bromine, R is hydrogen or a methyl radical, $n$ is an integer from zero to 2, $m$ is 2 or 3, and $a$ is zero to 12.

DETAILED DESCRIPTION

These new N-alkenylcarbamates, when pure, are white crystalline compounds of moderate melting point or viscous liquids. The liquids are moderately soluble in common organic solvents while the solids are sparingly soluble or insoluble in most organic solvents. They are easily prepared by contacting the alkenyl isocyanate with the dihydroxy compound at about ambient temperature in an inert organic solvent. Ethers such as diethyl ether and tetrahydrofuran are preferred reaction solvents. In some cases, it is desirable to warm the reaction mixture to obtain essentially complete reaction in a relatively short time.

The ratio of reactants is not critical, but for most efficient operation the alkenyl isocyanate is employed in about the stoichiometric amount or slightly in excess of that quantity, for example, 2–2.5 moles per mole of dihydroxy compound. It is usually preferable to carry out the reaction in the presence of a condensation catalyst such as sodium hydride or dibutyltin dilaurate in order to obtain a faster rate of reaction.

Since the solid reaction products are relatively insoluble substances, they usually are precipitated from the reaction mixture substantially as formed and so are easily recovered by simple filtration, washing, and drying steps. Alternatively, liquid or solid products be isolated by evaporating the reaction solvent.

EXAMPLE 1

A solution of 10.5 g. of p,p'-isopropylidenediphenol in 200 g. of ether was stirred at room temperature and 0.42 g. of sodium hydride was added. To this mixture there was added 24.6 g. of vinyl isocyanate over a period of ten minutes. The reaction mixture was stirred for 60 hours and the white solid which precipitated was filtered off, recrystallized from tetrahydrofuran and dried in a vacuum oven. The product was insoluble in chloroform, ether, and acetone and melted at 207–210° C. Elemental analysis and nuclear magnetic resonance measurements confirmed the structure of the product as that of the expected bis(N-vinylcarbamate) of p,p'-isopropylidenediphenol. Yield of the product was 42% based on the starting bisphenol.

EXAMPLE 2

A mixture of 27.2 g. of 4,4'-isopropylidenebis-(2,6-dibromophenol), 40 mg. of sodium hydride dispersed in mineral oil, and 200 ml. of tetrahydrofuran was stirred at room temperature while 14 g. of vinyl isocyanate was added slowly. The reaction mixture was stirred for an additional two hours, then the solvent and excess vinyl isocyanate were evaporated to obtain an off-white solid residue. This product was washed with hexane and dried to obtain a white powder. The nuclear magnetic resonance spectrum of the product was consistent with the structure of the expected bis(N-vinylcarbamate) of 4,4'-isopropylidenebis(2,6-dibromophenol). The product melted at 143° C. The yield was 90% of the theoretical.

EXAMPLE 3

Bisphenol A was hydrogenated to obtain 4,4'-isopropylidenedicyclohexanol. A solution of 2.8 g. of the hydrogenated bisphenol in 300 ml. of tetrahydrofuran was stirred at room temperature, two drops of dibutyltin dilaurate was added, and 20 g. of vinyl isocyanate was added dropwise. After the addition, the reaction mixture was heated to distill off some of the solvent, thereby producing a thick yellowish paste. Upon pouring this paste into excess n-hexane, a fluffy yellowish solid precipitated and this was filtered off and dried under vacuum. Nuclear magnetic resonance measurements confirmed the structure of the product as that of the expected diadduct, 4,4'-isopropylidenedicyclohexyl bis(N-vinylcarbamate). The product melted at 180° C. and was obtained in 65% yield.

EXAMPLE 4

2,2' - isopropylidenebis(p-phenyleneoxy)diethanol was prepared by adding two moles of ethylene oxide to a mole of Bisphenol A. A mixture of 15.8 g. of this diol and three drops of dibutyltin dilaurate in 200 ml. of tetrahydrofuran was stirred at room temperature while 14 g. of vinyl isocyanate was added dropwise. After stirring for an additional two hours, most of the solvent was distilled from the mixture to obtain a viscous residue which was triturated in n-hexane at ice temperature to form a white solid. The product was separated, washed and dried for analysis. The NMR spectrum of this material confirmed its structure as that of the expected diadduct, 2,2'-[isopropylidenebis(p-phenyleneoxy)] diethyl bis(N - vinylcarbamate). The yield was 82%.

EXAMPLE 5

The adduct of six moles of ethylene oxide with a mole of tetrabromo Bisphenol A was prepared in the usual way and was obtained as a thick brown oil. A portion of 53 g. of this adduct was dissolved in 200 ml. of tetrahydrofuran in a reaction flask and two drops of dibutyltin dilaurate was added. The solution was stirred at room temperature while 23 g. of vinyl isocyanate was added dropwise. Excess vinyl isocyanate and solvent were stripped off under reduced pressure to obtain as the residue a brown oil representing a 92% yield of the expected bis-(N-vinylcarbamate). Identity of the product was confirmed by infrared absorption analysis.

EXAMPLE 6

Bisphenol A was reacted with propylene oxide to produce the adduct containing an average of 20.6 moles of propylene oxide moieties per mole of bisphenol. This adduct, a colorless viscous oil, was dissolved in 100 ml. of tetrahydrofuran and two drops of dibutyltin dilaurate was added to the solution. A quantity of 14 g. of vinyl isocyanate was added dropwise at room temperature. Excess vinyl isocyanate and solvent were distilled off under reduced pressure, leaving as the residue a slightly yellowish viscous oil. This was identified as above as the expected bis(N-vinylcarbamate) of the starting bisphenolpropylene oxide adduct. The crude product represented a yield of 87% of the theoretical amount.

In Examples 1–6, equivalent quantities of isopropenyl isocyanate may be substituted for vinyl isocyanate to produce the corresponding bis(N-isopropenylcarbamates). These compounds have physical and chemical properties similar to those of the related vinyl compounds.

By the general procedure described in the foregoing examples, the diadducts of vinyl isocyanate and isopropenyl isocyanate with other derivatives of Bisphenol A are prepared. In this way, there are prepared such compounds as 2,2' - [isopropylidenebis(1,4-cyclohexyleneoxy)]diethyl bis(N-vinylcarbamate), 4,4' - isopropylidenebis(2 - chlorophenyl) bis(N-isopropenylcarbamate), 2,2' - [isopropylidenebis(2,6-dichloro-p-phenyleneoxy)] diethyl bis(N-vinylcarbamate), and the bis(N-isopropenylcarbamate) of 1,1' - [isopropylidenebis(p-phenyleneoxy)] di-2-propanol. Other compounds similarly obtainable include the bis(N-isopropenylcarbamate) of hydrogenated Bisphenol A, the bis(N-isopropenylcarbamate) of the adduct of tetrabromo Bisphenol A with 2–24 moles of propylene oxide, and the bis(N-isopropenylcarbamate) of Bisphenol A.

Polymers and copolymers of these compounds have properties derived from the relatively rigid backbone afforded by the Bisphenol A or modified Bisphenol A nucleus in these molecules. Typical examples of such polymers are described in Examples 7 and 8.

EXAMPLE 7

Two mixtures of 21.1 g. of the bis(N-vinylcarbamate) product of Example 5 and 0.1 g. each of tert-butyl perbenzoate and tert-butyl peroctoate were heated at 100° C. in sealed aluminum containers for five hours. The polymerized products thereby obtained were hard, amber-colored bars 3.5 x 0.5 x 0.128 inches in size. These bars had an average flex strength of 1595 lbs. per square inch and an average flex modulus of 19,500 p.s.i. as determined by ASTM D–790–61 modified to accommodate the size of the test bars. Boyer heat distortion was at 59° C. The polymer was resistant to burning.

EXAMPLE 8

Polypropylene glycol, average molecular weight 400 (P–400), was reacted with excess vinyl isocyanate in ether solution at room temperature for 15–20 hours to obtain the expected P–400 bis(N-vinylcarbamate), a slightly yellowish oil. Two mixtures of 9.15 g. of this product, 12.38 g. of the bis(N-vinylcarbamate) product of Example 5, and 0.1 g. each of tert-butyl perbenzoate and tert-butyl peroctoate were heated for 5 hours at 100° C. in sealed aluminum containers to obtain amber bars of the solid copolymer. These bars, 3.5 x 0.5 x 0.13 inches in size, had an average flex strength of 547 p.s.i. and an average flex modulus of 14,250 p.s.i. as determined by modified ASTM D–790–61.

As shown in Examples 7 and 8, the bis(alkenyl-carbamates) of the invention are polymerized or copolymerized with other vinyl monomers to produce corresponding polymers which have properties comparable to those of the above examples. These new compounds are also useful as cross-linking reagents.

We claim:

1. The compound of the formula (A) 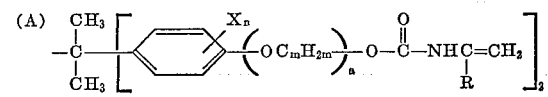

or (B) 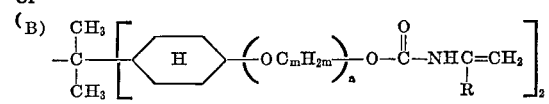

wherein X is chlorine or bromine, R is hydrogen or a methyl radical, $n$ is an integer from zero to 2, $m$ is 2 or 3, and $a$ is zero to 12.

2. The compound of claim 1 having Formula A.

3. The compound of claim 1 having Formula B.

4. The compound of claim 2 wherein $a$ and $n$ are zero and R is hydrogen, said compound being p,p'-isopropylidenediphenyl bis(N-vinylcarbamate).

5. The compound of claim 2 wherein $n$ is zero, $m$ is two, $a$ is one, and R is hydrogen, said compound being the bis(N-vinylcarbamate) of 2,2'-[isopropylidenebis(p-phenyleneoxy)]diethanol.

6. The compound of claim 2 wherein $n$ is two, $a$ is zero, X is bromine, and R is hydrogen, said compound being the bis(N-vinylcarbamate) of 4,4'-isopropylidenbis(2,6-dibromophenol).

7. The compound of claim 2 wherein $m$ and $n$ are each two, $a$ is three, R is hydrogen, and X is bromine, said compound being the bis(N-vinylcarbamate) of the adduct of 4,4'-isopropylidenebis(2,6-dibromophenol) and six moles of ethylene oxide.

8. The compound of claim 2 wherein $n$ is zero, $m$ is three, $a$ is about ten, and R is hydrogen, said compound being the bis(N-vinylcarbamate) of the adduct of p,p'-isopropylidenediphenol and about twenty moles of propylene oxide.

9. The compound of claim 3 wherein $a$ is zero and R is hydrogen, said compound being 4,4'-isopropylidenedicyclohexyl bis(N-vinylcarbamate).

References Cited

UNITED STATES PATENTS 2,533,189   12/1950   Flory et al. _____ 260—482

JAMES A. PATTEN, Primary Examiner

V. GARNER, Assistant Examiner

U.S. Cl. X.R.

252—8.1; 260—78, 482